(12) United States Patent
Li

(10) Patent No.: US 11,060,880 B2
(45) Date of Patent: Jul. 13, 2021

(54) ROUTE PLANNING METHOD AND APPARATUS, COMPUTER STORAGE MEDIUM, TERMINAL

(71) Applicant: Tencent Technology (Shenzhen) Company Limited, Shenzhen (CN)

(72) Inventor: Xue Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 74 days.

(21) Appl. No.: 16/353,508

(22) Filed: Mar. 14, 2019

(65) Prior Publication Data

US 2019/0212163 A1 Jul. 11, 2019

Related U.S. Application Data

(63) Continuation of application No. PCT/CN2017/114496, filed on Dec. 4, 2017.

(30) Foreign Application Priority Data

Dec. 13, 2016 (CN) .......................... 201611149580.6

(51) Int. Cl.
 G01C 21/36 (2006.01)
 G01C 21/32 (2006.01)
 G01C 21/20 (2006.01)

(52) U.S. Cl.
 CPC ......... *G01C 21/3623* (2013.01); *G01C 21/20* (2013.01); *G01C 21/32* (2013.01)

(58) Field of Classification Search
 CPC ..... G01C 21/20; G01C 21/32; G01C 21/3623
 See application file for complete search history.

(56) References Cited

U.S. PATENT DOCUMENTS 9,222,797 B2 * 12/2015 Abramovich Ettinger ................. G01C 21/3682
2009/0006211 A1 * 1/2009 Perry ................. G06Q 30/0277 705/14.66

(Continued)

FOREIGN PATENT DOCUMENTS

CN 101655369 A 2/2010
CN 101726311 A 6/2010

(Continued)

OTHER PUBLICATIONS

International Search Report, issued in International Application No. PCT/CN2017/114496, dated Jun. 21, 2018, pp. 1-10, Chinese Patent Office, Beijing, CN.

(Continued)

*Primary Examiner* — Behrang Badii
*Assistant Examiner* — Daniel L Greene
(74) *Attorney, Agent, or Firm* — Brinks Gilson & Lione

(57) ABSTRACT

A navigation system may be provided. The navigation system may obtain an image comprising displayable content. The navigation system may receive a trigger instruction to plan a route based on the image. The navigation system may recognize, by an image recognition system, in response to receipt of the trigger instruction, feature content included in the displayable content. The feature content may be indicative of a target geographic location. The system may generate, in response to recognition of the feature content, at least one route from a current geographic location of a terminal to the target geographic location.

18 Claims, 7 Drawing Sheets

(56) References Cited

U.S. PATENT DOCUMENTS

| | | | | |
|---|---|---|---|---|
| 2012/0296579 | A1* | 11/2012 | Poling | G06Q 10/06 702/50 |
| 2015/0128020 | A1* | 5/2015 | Chavez | G06Q 10/101 715/230 |
| 2015/0185030 | A1* | 7/2015 | Monroe | G01C 21/20 701/532 |
| 2016/0154821 | A1* | 6/2016 | Kansal | G06K 9/4652 382/218 |
| 2016/0155150 | A1* | 6/2016 | Zhang | G06Q 30/0261 705/14.58 |
| 2018/0107951 | A1* | 4/2018 | Mowatt | G06Q 50/14 |

FOREIGN PATENT DOCUMENTS

| | | |
|---|---|---|
| CN | 103134489 A | 6/2013 |
| CN | 103376110 A | 10/2013 |
| CN | 103424113 A | 12/2013 |
| CN | 104422439 A | 3/2015 |
| CN | 104655125 A | 5/2015 |
| CN | 105188135 A | 12/2015 |
| CN | 105547312 A | 5/2016 |
| CN | 105841687 A | 8/2016 |
| CN | 105890597 A | 8/2016 |
| CN | 105890616 A | 8/2016 |
| CN | 106679665 A | 5/2017 |
| JP | 2001215123 A | 8/2001 |

OTHER PUBLICATIONS

Chinese Office Action, issued in Chinese Application No. 2016111495806, dated Feb. 12, 2019, pp. 1-8, Chinese Patent Office, Beijing, China.

Office Action dated Jun. 17, 2020 for Chinese Application No. 201611149580.6 with concise English Translation, 9 pages.

* cited by examiner

ROUTE PLANNING METHOD AND APPARATUS, COMPUTER STORAGE MEDIUM, TERMINAL

CROSS REFERENCE TO RELATED APPLICATIONS

This application is a continuation of International Application PCT/CN2017/114496, filed Dec. 4, 2017 entitled METHOD AND APPARATUS FOR PLANNING ROUTE, COMPUTER STORAGE MEDIUM AND TERMINAL, which claims priority to Chinese Patent Application No. 201611149580.6 filed on Dec. 13, 2016, both of which are incorporated herein by reference in their entirety.

TECHNICAL FIELD

The present disclosure relates to the field of communication technologies, and specifically, to a route planning and navigation.

BACKGROUND

Traveling may involve planning routes to specific locations using navigation systems. The navigation systems may provide a navigable route or turn-by-turn directions to a target location from a starting location. To receive navigation from the navigation systems, the target location, such as an address, coordinates, name, or other information, may be provided to the navigation system before navigation information is received. Providing information to the navigation systems and obtaining navigation information from the navigation systems suffers from a variety of drawbacks, limitations, and disadvantages.

In daily life, scenarios where routes need to be planned often appear. For example, a specific person needs to go to an activity site, there are usually signs for the activity site on a road leading to the activity site, and the signs are used for indicating a specific geographic location of a destination that needs to be arrived at, for example, Conference Center of Kexing Science Park, Shenzhen. However, if it is the first time for the person to go to the destination, the person is usually very unfamiliar with a route, and consequently, cannot arrive at the destination quickly. Alternatively, for example, if it is agreed between friends to meet together at a location of a specific person, but this person does not know his or her specific geographic location, and needs to communicate many times to determine a detailed location, for example, to comprehensively determine a location by asking about a surrounding environment and the like, it is very difficult to find the location, and it is also relatively complex to plan a route. During route planning in the existing technology, it is always needed to personally determine a geographic location of a destination, then, open a map, and input text of the destination, and finally, the map provides a navigation route. Using the existing technology is extremely inconvenient, is very difficult, and has a high miss rate.

SUMMARY

Aspects of the present disclosure may describe systems and methods related to route planning and/or navigation. For example, a system may obtain a to-be-processed image, the image being used for indicating a target geographic location that needs to be arrived at. The system may recognize the image, and obtain, in the image, key information used for determining the target geographic location when a trigger instruction for planning a route by using an image is detected. The system may generate at least one route from a current geographic location of a terminal to the target geographic location according to the key information. Additional and alternative aspects are provided in the systems and methods described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
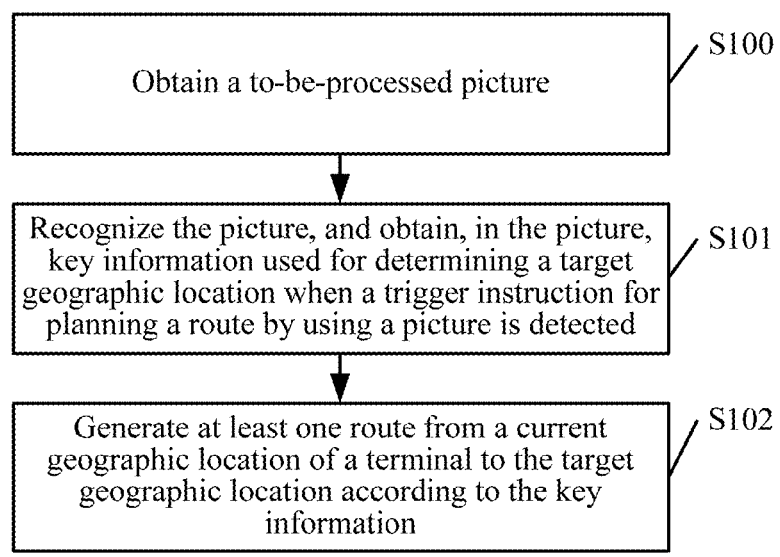
FIG. 1 illustrates a flowchart of example logic for a navigation system.

Users traveling between locations may access a navigation system to receive navigation information such as routes or navigation instructions. In many circumstances, a user may forget to supply the target location to the navigation system. Alternatively, the user may not have direct knowledge of identifying information for the target location that the navigation system receives to determine navigation information. In some circumstances, the user may perform additional steps, such as searching, to determine the identifying information for the target location resulting in additional steps and inefficiency. Manually determining a geographic location of a destination for input into a navigation system may be inconvenient, inefficient, difficult, and/or error prone due to typographical errors, misunderstanding, or other human error.

In one example, a person may be traveling to an activity site. Signs for the activity site on a road leading to the activity site may indicate a specific geographic location of a destination that needs to be arrived at, for example, Conference Center of Kexing Science Park, Shenzhen. However, if it is the first time for the person to go to the destination, the person is usually very unfamiliar with a route, and consequently, cannot arrive at the destination quickly.

In another example, friends may agree to meet together at a location of a specific person, but this person does not know his or her specific geographic location, and may needs to communicate many times to determine a detailed location, for example, to comprehensively determine a location by asking about a surrounding environment and the like.

The system and methods described herein may provide technical advancements to route planning and navigation. An example of a technical advancement described by the systems and methods described herein may be that during route planning, an image carrying a target geographic location may be recognized, and a route may be determined based on the recognition on the image. In this way, route planning and navigation may be completed without requiring a user to manually input a detailed address, so as to simplify navigation and improve navigation precision.

Another technical advancement achieved by the system and methods described herein may be that when route planning is performed, first, the route planning can be completed without inputting a detailed address to a map application, and in this way, even if a user does not known a detailed address, navigation can still be performed. Second, the user may be relieved from manually inputting an address or other identifying information corresponding to a target geographic location. The user may collect, receive, and/or download an image, and a terminal may complete route planning and navigation by means of image recognition, thereby simplifying user operations, and improving intelligence of the terminal and satisfaction of user experience. Third, recognition of the image, compared with an incorrect or vague address manually input by the user, greatly improves precision of navigation and features a high accuracy rate.

The following describes the route planning method according to the embodiments of the present disclosure in detail with reference to FIG. 1 to FIG. 8. FIG. 1 illustrates a flowchart of example logic for a navigation system. The logic may include the following operations S100 to S102.

At S100, the navigation system may obtain a to-be-processed image, the image being used for indicating a target geographic location that needs to be arrived at.

In this embodiment of the present disclosure, the to-be-processed image may include displayable content indicative a target geographic location. The target geographic location may include a destination. For example, the target geographic location may include coordinates or information representative of a physical location. Displayable content of the image may include digital content that is displayable on a electric screen according to an image format. The displayable content may include feature content. The feature content may include at least a portion of the displayable content. The feature content may indicate or represent the target geographic location. For example, the feature content may include a digital representation of a physical object indicative of the target geographic location. In some examples, the feature content may include may include an identifier (XX Mansion) of the target geographic location and an orientation graphic (a left-turn arrow graphic), or the image may include a geographic situation of the target geographic location that needs to be arrived at such as a surrounding construction or a road identifier of the target geographic location that needs to be arrived at. In other words, the feature content may include other displayable information that is an image of a physical geographic location, contains descriptive information of the physical geographic location, and/or displayable information that is associated with an identifier of the physical geographic location.

Figure 3:
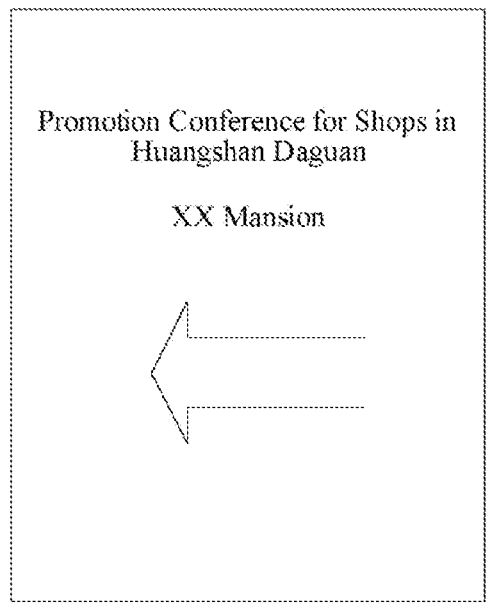
FIG. 3 is a schematic diagram of a sign according to an embodiment of the present disclosure.
Figure 4:
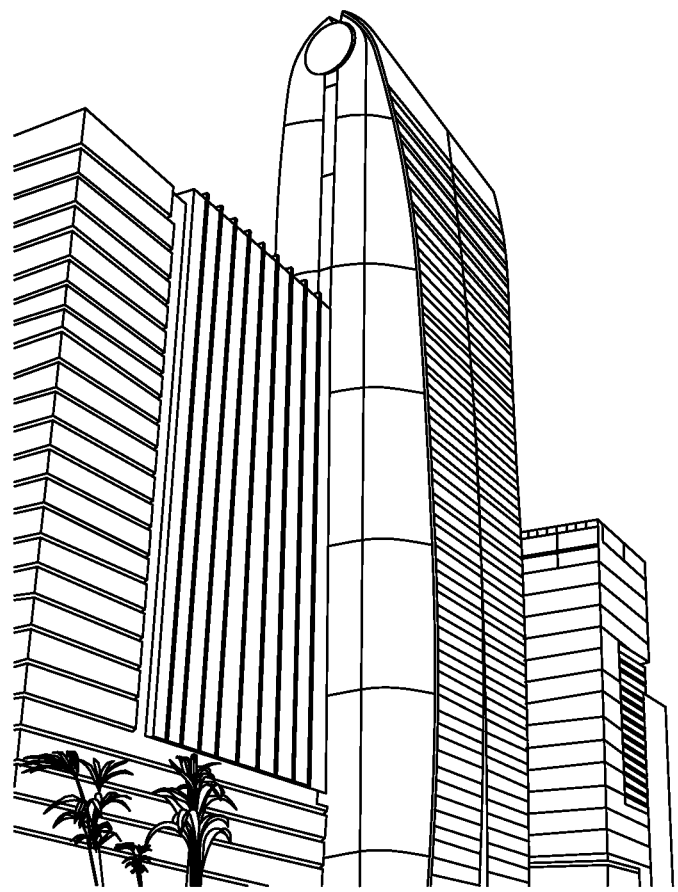
FIG. 4 is a schematic diagram of a scenario according to an embodiment of the present disclosure.

The to-be-processed image may be an image taken by a terminal. For example, if a user is on the way to a target geographic location, there is a sign, and the sign includes an identifier of the target geographic location, the user can photograph the sign, so as to obtain obtaining a picture used for indicating the target geographic location that needs to be arrived at. FIG. 3 shows a sign, and the user can photograph the sign. Alternatively, the image may be an image received by using an instant messaging application. For example, a user and a specific friend meet together at a location of the friend, but the friend does not know a detailed name of the location, and the friend can take an image of a reference object having a representative key feature around, and transmit the image to the user by using the instant messaging application. FIG. 4 shows a taken image of a reference object having a representative key feature. Alternatively, the image may be an image downloaded from a website. For example, when a large-scale conference or activity will be held, a website provides specific geographic location information of the large-scale conference or activity, and the user can take an image including the specific geographic location information. The specific geographic location information may be a geographic identifier or a geographic situation of the geographic location such as a surrounding road sign or construction.

In some embodiments, the to-be-processed image may alternatively be received from another device. For example, a friend A and a friend B want to meet up, the friend A send a taken image of a target geographic location to a terminal device carried by the user B by using a communication application such as a social application.

In this embodiment, the step S100 may include, but is not limited to the following manners:

capturing, by a terminal, an image of a target geographic location;

receiving the image from another terminal; and downloading the image from a network.

At S101 the navigation system may recognize the image, and obtain, in the image, key information used for determining the target geographic location when a trigger instruction for planning a route by using an image is detected. In other words, the navigation system may detect a trigger instruction to plan a route based on the image. The navigation system may recognize, by an image recognition system, feature content corresponding to a target geographic location in response to detection of the trigger instruction.

In this embodiment of the present disclosure, to enable the user to arrive to the target geographic location from the current geographic location of the terminal, it is needed to perform route planning. A convenient and fast route planning manner is used in the present disclosure. To be specific, planning is directly performed by using an image used for indicating a target geographic location. The trigger instruction may be pressing and holding the image, so as to display a callout menu. The key information may be any information directing to the target geographic location, or information related to the target geographic location, or description information describing the geographic location. If classification is performed in terms of information type, the key information may be text information and/or icon information located in the to-be-processed image. The text information may be: various types of text information identifying the target geographic location, for example, information such as the longitude and latitude, a street number, and orientation information of the target geographic location and a neighboring street nearby the target geographic location.

If classification is performed in terms of information content, the key information may include geographic identification information and orientation information of the target geographic location. The geographic identification information may directly include longitude and latitude information and detailed address information. The orientation information may be orientation information relative to a current navigation device, orientation information of a target building corresponding to the target geographic location, and the like.

In a word, the key information herein may be associated information directing to a target geographic location, a target building, or the like, and during navigation, route planning is performed according to the information.

Figure 5:
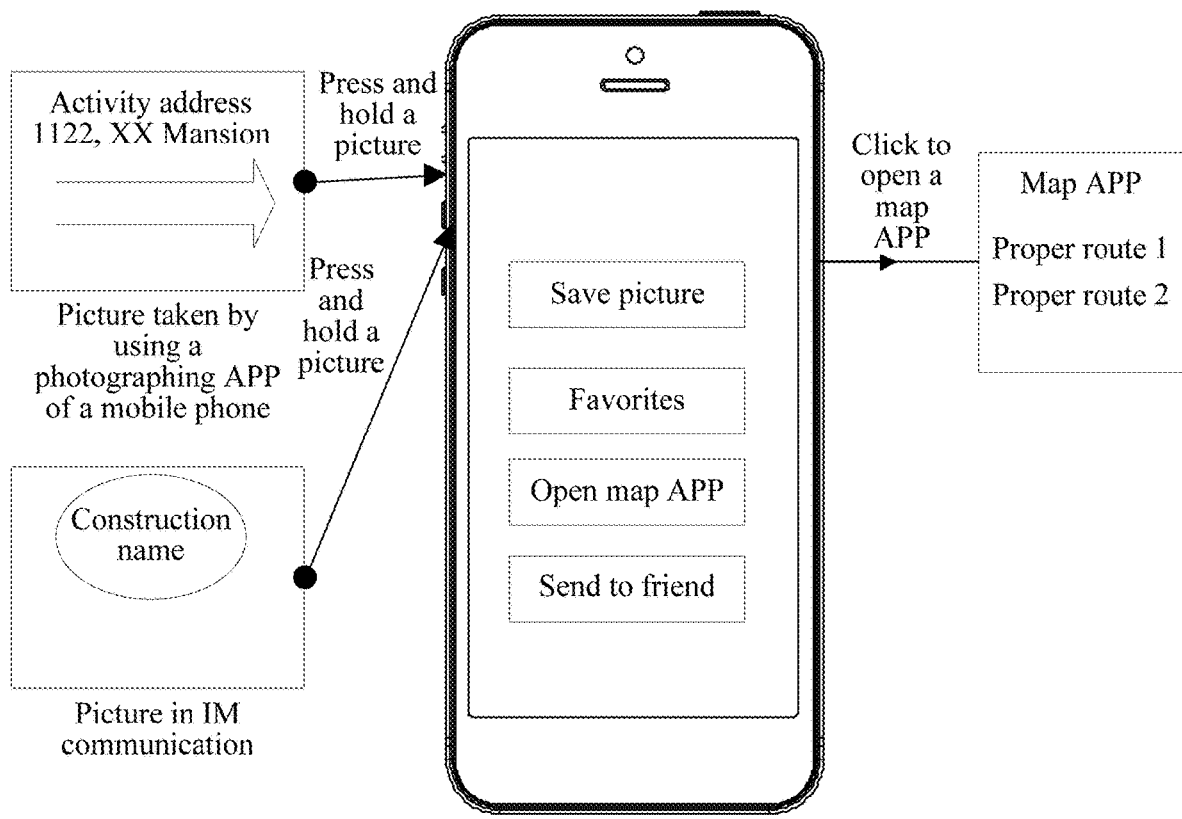
FIG. 5 is a schematic diagram of route planning according to an embodiment of the present disclosure.

FIG. 5 shows a schematic diagram of a callout menu according to an embodiment of the present disclosure. The to-be-processed image may be an image taken by using a photographing application of a mobile phone or an image received during communication by using an instant messaging application. When a user presses and holds the image, a callout menu is displayed. The callout menu includes a plurality of options such as "Save image", "Favorites", "Open map APP", and "Send to friend". The user may check the plurality of options. The options correspond to different processing functions implemented on the image. For example, if "Save image" is clicked, the image is saved, and if "Open map APP" is clicked, a map APP is invoked. Meanwhile, the image is recognized, to obtain, in the image, the key information used for determining the target geographic location. A location of the target geographic location in a map is determined according to the key information, so as to plan at least one route from the current geographic location to the target geographic location.

The map APP may be various application programs capable of providing maps and navigation, for example, Google Maps or Baidu Map. Applications, such as the map APP, are installed in a terminal. The terminal may be a human-carried mobile device such as a mobile phone, a tablet computer, or a wearable device, or a vehicle-mounted device such as a navigation instrument mounted on a vehicle. The map APP may display various graphical indicators that represent a geographic location and/or routes to/from the geographic location. For example, the terminal may display, by way of the map APP, a first graphical indicator for the current location of the terminal, a second graphical indicator for a target location, and/or a graphical indicator representative of a route between the current geographic location and the target geographic location.

Optionally, the key information is determined according to a type of the image. For example, if the type of the image is the indication sign type, the key information may be a keyword used for representing a geographic identifier in the image such as "XX Mansion", "No. X, XX Road", and "Unit XX, Building XX, XX housing estate". It should be noted that when an image is recognized to extract key information in the image, a keyword may be preset in a database, so that when the image is recognized, text in the image is matched with the preset keyword, and the matched text is determined as the key information of the image, and further, the key information may include a graphic, it is also needed to preset an preset orientation graphic in the database.

For another example, if the type of the image is the geographic situation type, the image indicates the target geographic location by using a surrounding geographic situation of the target geographic location such as a surrounding construction having a specific key feature photographed by another user. When the image is recognized, if it is determined that the content in the image is a geographic situation, a reference object having a key feature is extracted from the image. The reference object may be a construction, and the key feature may be a shape feature of the construction. For some representative constructions, the shape feature may be a geographic identifier identifying the construction, such as the construction of China Merchants Bank, Tencent Building, and the like that all have particular shapes. Alternatively, the representative feature may be logo text on the construction. For example, names of some constructions are identified on the constructions. The particular shape herein may include: a particular outline of the construction. The key feature may further include, in addition to the shape feature, a feature combined with a special material such as the reinforcing bar structure feature of the Bird's Nest and the membrane structure feature of the Water Cube. It should be noted that logo text, shape features, and the like of some representative reference objects can be stored in the database in advance, so as to facilitate rapidly determining a name of the reference object and a geographic location thereof in a map in subsequent matching.

Optionally, the key feature may be an estimated distance between the reference object and the target geographic location, an estimated relative angle between the reference object and the target geographic location, and the like.

In this embodiment, a type of the to-be-processed image can be obtained by performing preliminary recognition on the image. For example, the preliminary recognition may include recognizing a graphic object included by the to-be-processed image. When the graphic object includes an indication sign such as a keyword of a geographic identifier, the type may be considered to be the indication sign type. When the graphic object includes constructions such as a building, a bridge, and a street, the image may be considered to be an image of the geographic situation type.

After the preliminary recognition is completed, a corresponding recognition manner is used according to type of the image, and a matching accurate recognition is subsequently performed on the image.

For example, for an image of the indication sign type, text in the image may be transformed into text by means of text transformation, so as to facilitate route planning according to text in the map application.

In some embodiments, to determine a type of the to-be-processed image, a classification control may alternatively be set in the navigation interface. When an image that needs to be used for navigation is obtained, a type of the image is determined according to an operation on the classification control. For example, the classification control includes a first control and a second control. Text "Indication sign type" is displayed on the first control, and text "Geographic situation type" is displayed on the second control. A user selects the first control or the second control by an operation such as a click or a slide. When detecting operation information of the user operating a corresponding control, the terminal obtains the type of the image.

At S102, the navigation system may generate at least one route from a current geographic location of a terminal to the target geographic location according to the key information. For example, the navigation system may generate, in response to recognition of the feature content corresponding to the target geographic location, at least one route from a current geographic location of a terminal to the target geographic location.

In this embodiment of the present disclosure, the target geographic location may be positioned in the map according to the key information extracted from the image. For example, if the key information is a keyword, a current location of the terminal is positioned by using a map APP, and a geographic identifier including the keyword is searched for around the current location of the terminal. The location identified by the geographic identifier including the keyword is determined as the target geographic location. By means of a built-in algorithm of the map APP, at least one route from the current geographic location of the terminal to the target geographic location can be generated.

For another example, if the key information is a key feature of at least one reference object in the image, it is needed to determine a geographic location of the reference object in the map by using the key feature, and optionally, determine a location of the target geographic location in the map according to an estimated distance between the reference object and the current geographic location of the terminal and an estimated angle between the reference object and the current geographic location. Further, by means of a built-in algorithm of the map APP, at least one route from the current geographic location of the terminal to the target geographic location can be generated.

A to-be-processed image is obtained, where the image is used for indicating a target geographic location that needs to be arrived at; when a trigger instruction for planning a route by using an image is detected, the image is recognized, and key information used for determining a target geographic location is obtained from the image; and at least one route from a current geographic location of a terminal to the target geographic location is generated according to key information. By recognizing an image used for indicating a target geographic location is recognized, this manner automatically plans a route, has high accuracy, and is convenient to use.

In this embodiment, during route planning, a preferred path is provided according to information such as a current traffic status.

Figure 2:
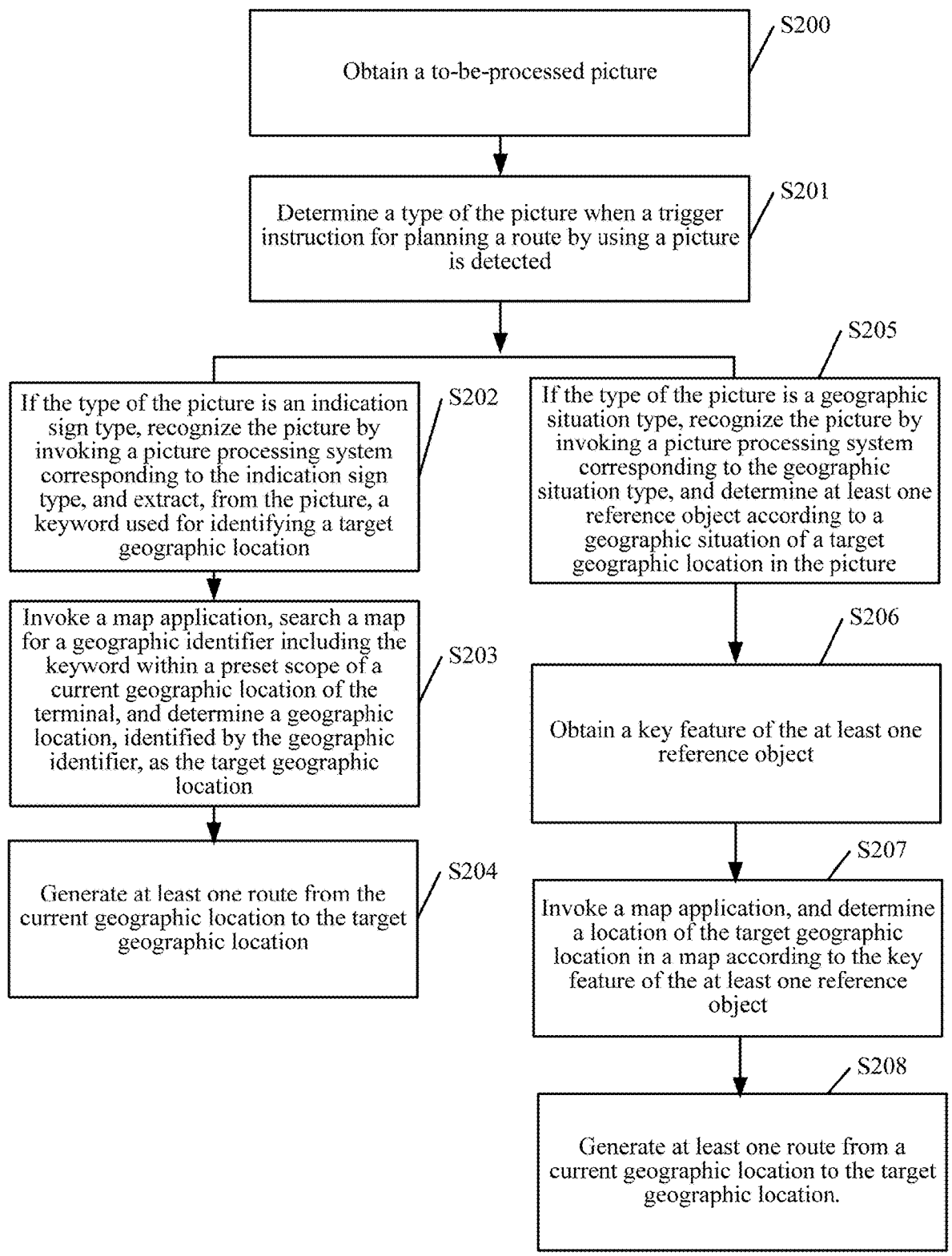
FIG. 2 illustrates a second flowchart of example logic for a navigation system.

Referring to FIG. 2, FIG. 2 illustrates a second flowchart of example logic for the route planning system.

At S200, the route planning system may obtain a to-be-processed image, the image being used for indicating a target geographic location that needs to be arrived at.

Refer to operation S100 in the embodiment of FIG. 1 for operation S200 in this embodiment of the present disclosure. Details are not described herein again.

At operation S201 the navigation system may determine a type of the image when a trigger instruction for planning a route by using an image is detected, the type of the image including an indication sign type or a geographic situation type. In other words, the navigation system may determine a type of the image, the type of the image comprising at least one of an indication sign type or a geographic situation type. The navigation system may extract, from the image, the feature content based on the type of the image. The navigation system may determine the target geographic location based on the feature content.

In this embodiment of the present disclosure, the trigger instruction may be pressing and holding the image, clicking the image, or double-clicking the image, or may be that a user can click a virtual button displayed on a display interface displaying the image, to send the trigger instruction. In other words, the trigger instruction may be generated based on a touch operation. The touch operation include a signal detected in response to holding the image, clicking the image, or double-clicking the image, and/or selecting buttons or controls that are associated with the image.

In this embodiment, the trigger instruction may be detected on a display interface of a map application. For example, a terminal currently starts a map application, a navigation interface of the map application displays the image, and a trigger instruction applied to the image is detected.

In some embodiments, detection of the trigger instruction is not limited to a map application. For example, in a social application, such as WeChat, an image is displayed; after it is detected that a user presses and holds the displayed image on a social interface of the social application, a navigation control is displayed, and after the navigation control is detected, a built-in navigation part of the social application is triggered to perform navigation, or an invocation interface docked with a map application is invoked, to start the map application, and the started map application is utilized to perform navigation.

Therefore, the trigger instruction may be detected in an application interface of a map application dedicated to navigation, or an application interface of another application.

As shown in FIG. 5, FIG. 5 is a schematic diagram of route planning according to an embodiment of the present disclosure. The trigger instruction is pressing holding the image. The image includes twos types. One is an indication sign type. As shown in the figure, the image is an image taken by a user by using a photographing APP of a mobile phone. The image includes: Activity address: 1122, XX Mansion, and the image further includes an orientation graphic, where the orientation graphic points to the right.

Referring to FIG. 5, the image may alternatively be an image of a geographic situation type. As show in the figure, the image may be an image received by using an instant messaging application APP. The image includes a construction and a name of the construction.

When a user presses and holds the image, the terminal displays a callout menu. The callout menu includes a plurality of options, and as shown in FIG. 5, the plurality of options is "Save image", "Favorites", "Open map APP", and "Send to friend". The user may check the plurality of options, to implement corresponding functions. As shown in the figure, the user may click the option "Open map APP", so as to implement the method for planning a route by using an image of this embodiment of the present disclosure.

At S202, the navigation system may determine if the type of the image is the indication sign type and recognize the image by invoking an image processing system corresponding to the indication sign type, and extract, from the image, a keyword used for identifying the target geographic location. For example, the navigation system may identify, in the displayable content of the image, a keyword indicative of the target geographic location.

At S203, the navigation system may invoke a map application, search a map for a geographic identifier including the keyword within a preset distance of the current geographic location of the terminal, and determine a geographic location, identified by the geographic identifier, as the target geographic location. For example, the navigation system may search a map for a geographic identifier corresponding to the keyword within a predetermined distance of the current geographic location of the terminal. The navigation system may select a geographic location associated with the geographic identifier as the target geographic location.

At S204, the navigation system may generate at least one route from the current geographic location to the target geographic location.

In this embodiment of the present disclosure, if the type of the image is the indication sign type, an image processing system corresponding to the indication sign type is invoked to recognize the image, a keyword used for identifying the target geographic location is extracted from the image, further, a map application is invoked, a map is searched for a geographic identifier including the keyword within a preset distance of the current geographic location of the terminal, a geographic location identified by the geographic identifier is determined as the target geographic location, and at least one route from the current geographic location to the target geographic location is generated.

Figure 6:
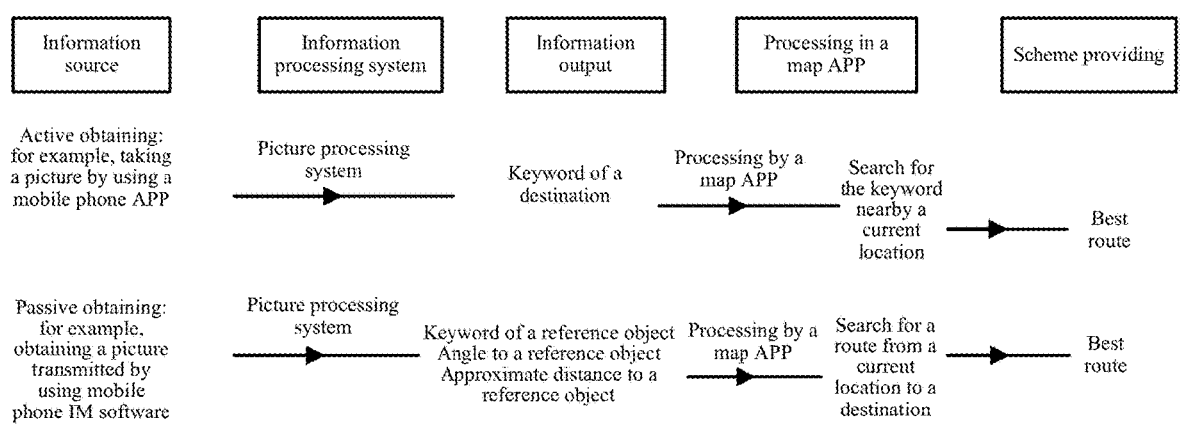
FIG. 6 is a flowchart of a navigation system according to an embodiment of the present disclosure.

Specifically, optionally, referring to FIG. 6, a navigation system (such as, an image processing system) of this embodiment of the present disclosure processes the image and outputs key information. The key information may be a keyword of a target geographic location such as an indication sign, geographic location-related text content, and an indicative orientation graphic such as an arrow. Then, a current geographic location of the terminal is positioned by using the GPS of the map, the map APP is opened to search for a location around the current geographic location, and a proper route map is provided with reference to the orientation graphic to guide the user to walk.

Figure 7:
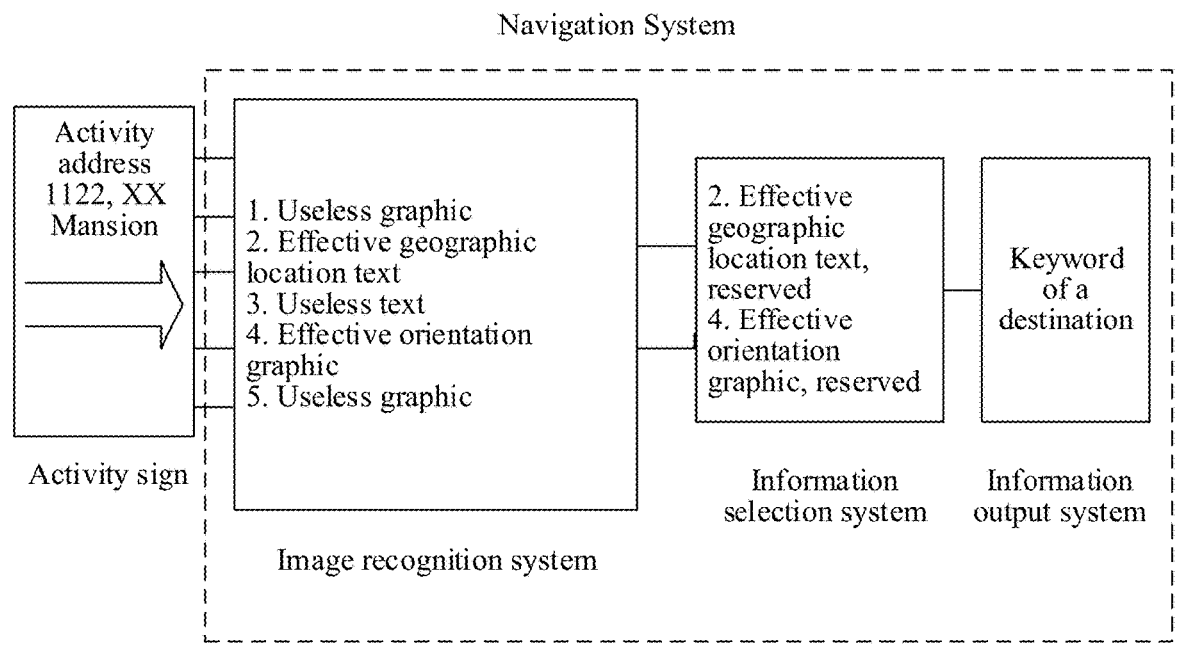
FIG. 7 is a schematic diagram of a navigation system of an indication sign type according to an embodiment of the present disclosure.

As shown in FIG. 7, FIG. 7 is a diagram of detailed processing of a navigation system according to an embodiment of the present disclosure. The navigation system includes an image recognition system, an information selection system, and an information output system. The information recognition system determines information (including graphic information and text information) included by the image. The information selection system screens, according to the type of the image and usefulness, the information included in the image, to reserve useful information and remove useless information. Optionally, the image may include a useless graphic, effective geographic location text, useless text, an effective orientation graphic, and a useless graphic. Therefore, it is needed to set a preset rule to screen information in the image. For example, the preset rule may be setting a preset keyword and a preset graphic, and matching information included in the image with the preset keyword and the preset graphic, so as to obtain useful information in the image such as effective geographic location text and an effective orientation graphic. The information output system outputs the keyword of the target geographic location to the map app, to perform processing of other sections.

At S205, the navigation system may determine if the type of the image is the geographic situation type and recognize the image by invoking an image processing system corresponding to the geographic situation type, and determine at least one reference object according to a geographic situation of the target geographic location in the image. For example, the navigation system may determine at least one reference object based on physical objects represented by the displayable content in the image. The navigation system may obtain a key feature of the at least one reference object.

At S206, the navigation system may obtain a key feature of the at least one reference object.

Optionally, the key feature includes at least one of an identifier of the reference object, a shape feature of the reference object, an estimated angle between the reference object and the target geographic location, and an estimated distance between the reference object and the target geographic location.

At S207, the navigation system may invoke a map application, and determine a location of the target geographic location in a map according to the key feature of the at least one reference object. In other words, the navigation system may determine a location of the target geographic location in a map according to the key feature of the at least one reference object.

At S208 the navigation system may generate at least one route from the current geographic location to the target geographic location.

In this embodiment of the present disclosure, if the type of the image is the geographic situation type, it is needed to determine at least one reference object according to the geographic situation in the image. The reference object may be a construction. Optionally, a key feature of the reference object is obtained. The key feature may be used for uniquely determining a geographic location of the reference object. For example, the key feature may be logo text on the construction. For example, usually, a construction has an identifier "XX Mansion". The key feature may alternatively be a shape feature of the construction. For example, Tencent Building has a unique shape feature. A name and a geographic location of the construction can be determined according to the shape of the construction. Optionally, the key feature may be an estimated angle between the reference object and the target geographic location. Alternatively, the key feature may be an estimated distance between the reference object and the target geographic location, and the like.

Optionally, referring to FIG. 6, a navigation system (such as, an image processing system) of this embodiment of the present disclosure processes the image and outputs key information. The key information may be a keyword of the reference object, an angle of the reference object, an approximate distance between the reference object and the target geographic location, and the like. Subsequently, an approximate location of the target geographic location in the map is determined according to the key feature of the reference object, and is displayed in the map. A current location of the terminal is positioned by using the GPS of the map, and then, at least one route from the current location to the target geographic location is planned.

Figure 8:
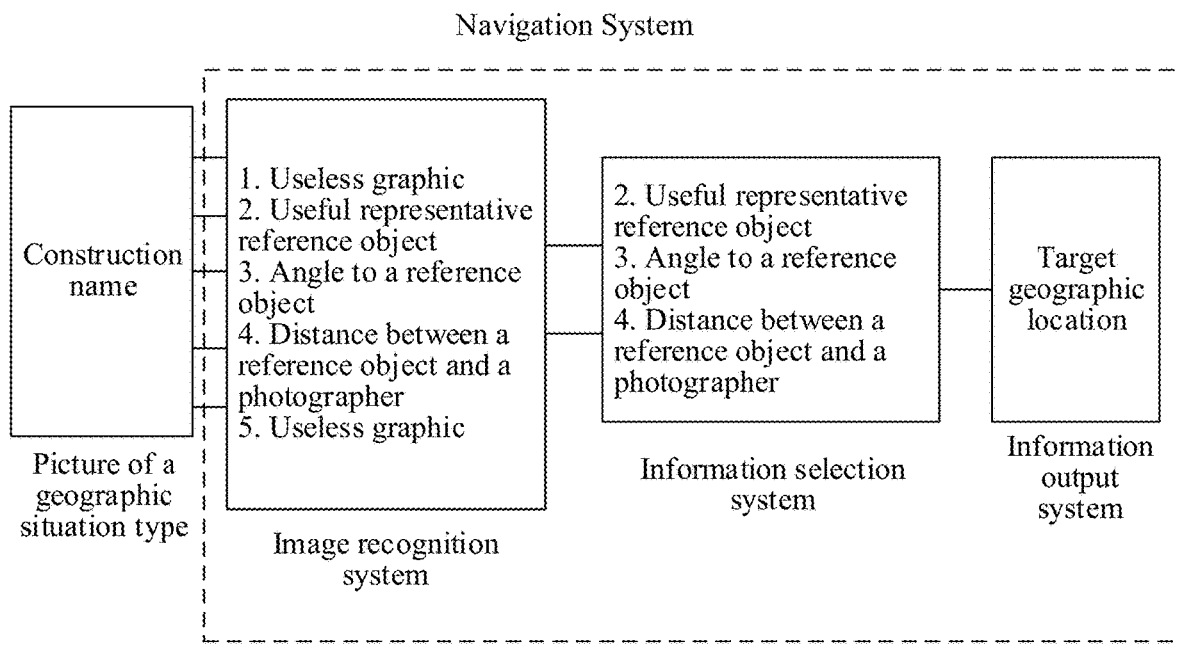
FIG. 8 is a schematic diagram of a navigation system of a geographic situation type according to an embodiment of the present disclosure.

Referring to FIG. 8, FIG. 8 is a diagram of detailed processing of a navigation system according to an embodiment of the present disclosure. The navigation system includes an image recognition system, an information selection system, and an information output system. The information recognition system determines information (including graphic information and text information) included by the image. The information included in the image may be a useless graphic and an effective reference object. When a reference object is determined, it is needed to select a reference object having a representative feature, so as to calculate an estimated angle between the reference object and a photographer, an estimated distance between the reference object and the photographer, and the like.

The information selection system determines a type of the image (the type includes an indication sign type and a geographic situation type) and usefulness, so as to reserve useful information and remove useless information. The useful information may be a reference object graphic. Further, an estimated angle between the reference object and the photographer and an estimated distance between the reference object and the photographer are calculated according to the reference object. The information output system outputs the target geographic location determined according to the key feature of the reference object. The map APP can plan at least one route from the current geographic location to the target geographic location.

A to-be-processed image is obtained, where the image is used for indicating a target geographic location that needs to be arrived at; when a trigger instruction for planning a route by using an image is detected, the image is recognized, and key information used for determining a target geographic location is obtained from the image; and at least one route from a current geographic location of a terminal to the target geographic location is generated according to key information. By recognizing an image used for indicating a target geographic location is recognized, this manner automatically plans a route, has high accuracy, and is convenient to use.

This embodiment of the present disclosure introduces the foregoing methods for determining route planning based on two image types by using the following two examples:

(1) In daily life, phenomena of arriving at a specific activity site according to activity signs often appear, but a user does not know to arrive at a destination at a current location. By means of the route planning method provided by the embodiments of the present disclosure, the user can take an image of a current activity sign, further, recognize geographic location-related text content "XX Mansion" and a left arrow indication in the image, and open a map App, where the map App automatically searches for a location of the keyword "XX Mansion" nearby the current location, and according to a directional guide, such as a left arrow, provides proper routes for the user to select.

(2) Several friends agree to meet up at a location of a specific target friend. However, because of similar or repeated place names, they are at different locations, and they have no choice but communicate many times to determine a detailed location, and comprehensively determine a location by asking about a surrounding environment and the like, where it is very difficult to find the location. By means of the route planning method provided by the embodiments of the present disclosure, a target friend A may use the present technology to take an image of his or her location by using a photographing APP, send the image to a friend B by using IM software; the friend B receives the image, opens a map APP to recognize text content in the image, and comprehensively determines an approximate location of the user A as a destination according to a distance and an angle to a representative reference object; and the friend user B selects the determined destination, and the map provides a best route for the friend B to use.

The following describes the route planning apparatus according to the embodiments of the present disclosure in detail with reference to FIG. 9 to FIG. 12.

Figure 9:
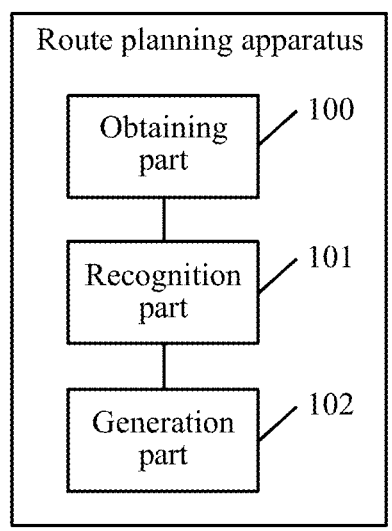
FIG. 9 is a schematic structural diagram of a route planning apparatus according to an embodiment of the present disclosure.

Referring to FIG. 9, FIG. 9 is a schematic structural diagram of a route planning apparatus according to an embodiment of the present disclosure. As shown in the figure, the route planning apparatus includes an obtaining part 100, a recognition part 101, and a generation part 102.

The obtaining part 100 is configured to obtain a to-be-processed image, the image being used for indicating a target geographic location that needs to be arrived at.

In this embodiment of the present disclosure, the to-be-processed image is used for indicating a target geographic location that needs to be arrived at. The target geographic location is a destination that a user needs to arrive at. Key information used for indicating the target geographic location exists in the image. For example, the image may include an identifier (XX Mansion) of the target geographic location and an orientation graphic (a left-turn arrow graphic), or the image may include a geographic situation of the target geographic location that needs to be arrived at such as a surrounding construction or a road identifier of the target geographic location that needs to be arrived at.

The to-be-processed image may be an image taken by a terminal. For example, if a user is on the way to a target geographic location, there is a sign, and the sign includes an identifier of the target geographic location, the user can photograph the sign, so as to obtain obtaining an image used for indicating the target geographic location that needs to be arrived at. FIG. 3 shows a sign, and the user can photograph the sign. Alternatively, the image may be an image received by using an instant messaging application. For example, a user and a specific friend meet together at a location of the friend, but the friend does not know a detailed name of the location, and the friend can take an image of a reference object having a representative key feature around, and transmit the image to the user by using the instant messaging application. FIG. 4 shows a taken image of a reference object having a representative key feature. Alternatively, the image may be an image downloaded from a website. For example, when a large-scale conference or activity will be held, a website provides specific geographic location information of the large-scale conference or activity, and the user can take an image including the specific geographic location information. The specific geographic location information may be a geographic identifier or a geographic situation of the geographic location such as a surrounding road sign or construction.

The recognition part 101 is configured to recognize the image, and obtain, in the image, key information used for determining the target geographic location when a trigger instruction for planning a route by using an image is detected.

In this embodiment of the present disclosure, to enable the user to arrive to the target geographic location from the current geographic location of the terminal, it is needed to perform route planning. A convenient and fast route planning manner is used in the present disclosure. To be specific, planning is directly performed by using an image used for indicating a target geographic location. The trigger instruction may be pressing and holding the image, so as to display a callout menu.

FIG. 5 shows a schematic diagram of a callout menu according to an embodiment of the present disclosure. The to-be-processed image may be an image taken by using a photographing application of a mobile phone or an image received during communication by using an instant messaging application. When a user presses and holds the image, a callout menu is displayed. The callout menu includes a plurality of options such as "Save image", "Favorites", "Open map APP", and "Send to friend". The user may check the plurality of options. The options correspond to different processing functions implemented on the image. For example, if "Save image" is clicked, the image is saved, and if "Open map APP" is clicked, a map APP is invoked. Meanwhile, the image is recognized, to obtain, in the image, the key information used for determining the target geographic location. A location of the target geographic location in a map is determined according to the key information, so as to plan at least one route from the current geographic location to the target geographic location.

Optionally, the key information is determined according to a type of the image. For example, if the type of the image is the indication sign type, the key information may be a keyword used for representing a geographic identifier in the image such as "XX Mansion", "No. X, XX Road", and "Unit XX, Building XX, XX housing estate". It should be noted that when an image is recognized to extract key information in the image, a keyword may be preset in a database, so that when the image is recognized, text in the image is matched with the preset keyword, and the matched text is determined as the key information of the image, and optionally, the key information may include a graphic, it is also needed to preset an preset orientation graphic in the database.

For another example, if the type of the image is the geographic situation type, the image indicates the target geographic location by using a surrounding geographic situation of the target geographic location such as a surrounding construction having a specific key feature photographed by another user. When the image is recognized, if it is determined that the content in the image is a geographic situation, a reference object having a key feature is extracted from the image. The reference object may be a construction, and the key feature may be a shape feature of the construction. For some representative constructions, the shape feature may be a geographic identifier identifying the construction, such as the construction of China Merchants Bank, Tencent Building, and the like that all have particular shapes. Alternatively, the representative feature may be logo text on the construction. For example, names of some constructions are identified on the constructions. It should be noted that logo text, shape features, and the like of some representative reference objects can be stored in the database in advance, so as to facilitate rapidly determining a name of the reference object and a geographic location thereof in a map in subsequent matching.

Optionally, the key feature may be an estimated distance between the reference object and the target geographic location, an estimated relative angle between the reference object and the target geographic location, and the like.

The generation part 102 is configured to generate at least one route from a current geographic location of a terminal to the target geographic location according to the key information.

In this embodiment of the present disclosure, the target geographic location may be positioned in the map according to the key information extracted from the image. For example, if the key information is a keyword, a current location of the terminal is positioned by using a map APP, and a geographic identifier including the keyword is searched for around the current location of the terminal. The location identified by the geographic identifier including the keyword is determined as the target geographic location. By means of a built-in algorithm of the map APP, at least one route from the current geographic location of the terminal to the target geographic location can be generated.

For another example, if the key information is a key feature of at least one reference object in the image, it is needed to determine a geographic location of the reference object in the map by using the key feature, and further, determine a location of the target geographic location in the map according to an estimated distance between the reference object and the current geographic location of the terminal and an estimated angle between the reference object and the current geographic location. Further, by means of a built-in algorithm of the map APP, at least one route from the current geographic location of the terminal to the target geographic location can be generated.

A to-be-processed image is obtained, where the image is used for indicating a target geographic location that needs to be arrived at; when a trigger instruction for planning a route by using an image is detected, the image is recognized, and key information used for determining a target geographic location is obtained from the image; and at least one route from a current geographic location of a terminal to the target geographic location is generated according to key information. By recognizing an image used for indicating a target geographic location is recognized, this manner automatically plans a route, has high accuracy, and is convenient to use.

Figure 10:
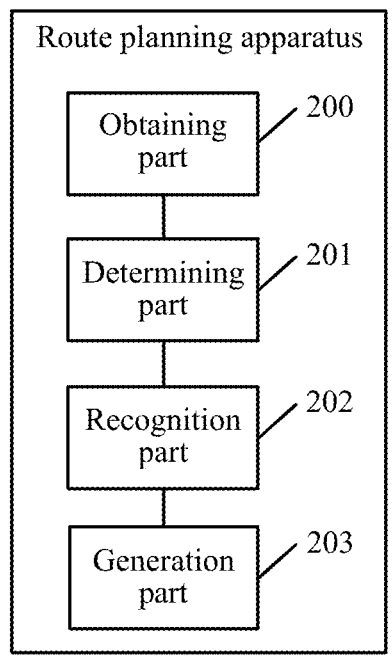
FIG. 10 is a schematic structural diagram of another route planning apparatus according to an embodiment of the present disclosure.

Referring to FIG. 10, FIG. 10 is a schematic structural diagram of another route planning apparatus according to an embodiment of the present disclosure. The route planning apparatus of this embodiment of the present disclosure is an apparatus obtained by optimizing the route planning apparatus of FIG. 9. As shown in the figure, the route planning apparatus includes an obtaining part 200, a determining part 201, a recognition part 202, and a generation part 203.

The obtaining part 200 is configured to obtain a to-be-processed image, the image being used for indicating a target geographic location that needs to be arrived at.

The determining part 201 is configured to determine a type of the image, the type of the image including an indication sign type or a geographic situation type.

In this embodiment of the present disclosure, the trigger instruction may be pressing and holding the image, clicking the image, or double-clicking the image, or may be that a user can click a virtual button displayed on a display interface displaying the image, to send the trigger instruction.

As shown in FIG. 5, FIG. 5 is a schematic diagram of route planning according to an embodiment of the present disclosure. The trigger instruction is pressing holding the image. The image includes twos types. One is an indication sign type. As shown in the figure, the image is an image taken by a user by using a photographing APP of a mobile phone. The image includes: Activity address: 1122, XX Mansion, and the image further includes an orientation graphic, where the orientation graphic points to the right.

Referring to FIG. 5, the image may alternatively be an image of a geographic situation type. As show in the figure, the image may be an image received by using an instant messaging application APP. The image includes a construction and a name of the construction.

When a user presses and holds the image, the terminal displays a callout menu. The callout menu includes a plurality of options, and as shown in FIG. 5, the plurality of options is "Save image", "Favorites", "Open map APP", and "Send to friend". The user may check the plurality of options, to implement corresponding functions. As shown in the figure, the user may click the option "Open map APP", so as to implement the method for planning a route by using an image of this embodiment of the present disclosure.

The recognition part 202 is configured to recognize the image by using an image recognition system corresponding to the type of the image, and extract, from the image, the key information used for determining the target geographic location.

Optionally, if the type of the image is the indication sign type:

The recognition part 202 is configured to recognize the image by invoking an image processing system corresponding to the indication sign type, and extract, from the image, a keyword used for identifying the target geographic location.

In this embodiment of the present disclosure, if the type of the image is the indication sign type, an image processing system corresponding to the indication sign type is invoked to recognize the image, a keyword used for identifying the target geographic location is extracted from the image, optionally, a map application is invoked, a map is searched for a geographic identifier including the keyword within a preset distance of the current geographic location of the terminal, a geographic location identified by the geographic identifier is determined as the target geographic location, and at least one route from the current geographic location to the target geographic location is generated.

Optionally, referring to FIG. 6, a navigation system (such as, an image processing system) of this embodiment of the present disclosure processes the image and outputs key information. The key information may be a keyword of a target geographic location such as an indication sign, geographic location-related text content, and an indicative orientation graphic such as an arrow. Then, a current geographic location of the terminal is positioned by using the GPS of the map, the map APP is opened to search for a location around the current geographic location, and a proper route map is provided with reference to the orientation graphic to guide the user to walk.

As shown in FIG. 7, FIG. 7 is a diagram of detailed processing of a navigation system according to an embodiment of the present disclosure. The navigation system includes an image recognition system, an information selection system, and an information output system. The information recognition system determines information (including graphic information and text information) included by the image. The information selection system screens, according to the type of the image and usefulness, the information included in the image, to reserve useful information and remove useless information. Optionally, the image may include a useless graphic, effective geographic location text, useless text, an effective orientation graphic, and a useless graphic. Therefore, it is needed to set a preset rule to screen information in the image. For example, the preset rule may be setting a preset keyword and a preset graphic, and matching information included in the image with the preset keyword and the preset graphic, so as to obtain useful information in the image such as effective geographic location text and an effective orientation graphic. The information output system outputs the keyword of the target geographic location to the map app, to perform processing of other sections.

Optionally, if the type of the image is the geographic situation type, the recognition part 202 includes:

a first determining subpart 2020, configured to recognize the image by invoking an image processing system corresponding to the geographic situation type, and determine at least one reference object according to a geographic situation of the target geographic location in the image; and an obtaining subpart 2021, configured to obtain a key feature of the at least one reference object.

Optionally, the key feature includes at least one of an identifier of the reference object, a shape feature of the reference object, an estimated angle between the reference object and the target geographic location, and an estimated distance between the reference object and the target geographic location.

In this embodiment of the present disclosure, if the type of the image is the geographic situation type, it is needed to determine at least one reference object according to the geographic situation in the image. The reference object may be a construction. Optionally, a key feature of the reference object is obtained. The key feature may be used for uniquely determining a geographic location of the reference object. For example, the key feature may be logo text on the construction. For example, usually, a construction has an identifier "XX Mansion". The key feature may alternatively be a shape feature of the construction. For example, Tencent Building has a unique shape feature. A name and a geographic location of the construction can be determined according to the shape of the construction. Optionally, the key feature may be an estimated angle between the reference object and the target geographic location. Alternatively, the key feature may be an estimated distance between the reference object and the target geographic location, and the like.

Optionally, referring to FIG. 6, a navigation system (such as, an image processing system) of this embodiment of the present disclosure processes the image and outputs key information. The key information may be a keyword of the reference object, an angle of the reference object, an approximate distance between the reference object and the target geographic location, and the like. Subsequently, an approximate location of the target geographic location in the map is determined according to the key feature of the reference object, and is displayed in the map. A current location of the terminal is positioned by using the GPS of the map, and then, at least one route from the current location to the target geographic location is planned.

Referring to FIG. 8, FIG. 8 is a diagram of detailed processing of a navigation system according to an embodiment of the present disclosure. The navigation system includes an image recognition system, an information selection system, and an information output system. The information recognition system determines information (including graphic information and text information) included by the image. The information included in the image may be a useless graphic and an effective reference object. When a reference object is determined, it is needed to select a reference object having a representative feature, so as to calculate an estimated angle between the reference object and a photographer, an estimated distance between the reference object and the photographer, and the like.

The information selection system determines a type of the image (the type includes an indication sign type and a geographic situation type) and usefulness, so as to reserve useful information and remove useless information. The useful information may be a reference object graphic. Further, an estimated angle between the reference object and the photographer and an estimated distance between the reference object and the photographer are calculated according to the reference object. The information output system outputs the target geographic location determined according to the key feature of the reference object. The map APP can plan at least one route from the current geographic location to the target geographic location.

The generation part 203 is configured to generate at least one route from a current geographic location of a terminal to the target geographic location according to the key information.

A to-be-processed image is obtained, where the image is used for indicating a target geographic location that needs to be arrived at; when a trigger instruction for planning a route by using an image is detected, the image is recognized, and key information used for determining a target geographic location is obtained from the image; and at least one route from a current geographic location of a terminal to the target geographic location is generated according to key information. By recognizing an image used for indicating a target geographic location is recognized, this manner automatically plans a route, has high accuracy, and is convenient to use.

Figure 11A:
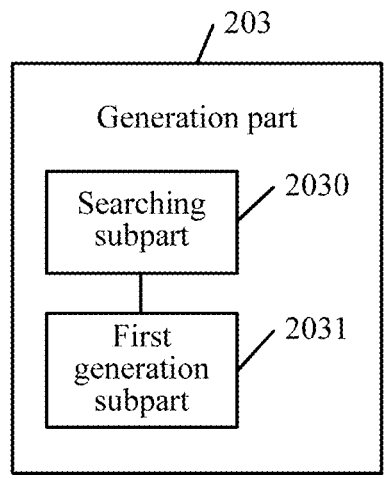
FIG. 11a is a schematic structural diagram of a generation part according to an embodiment of the present disclosure.
Figure 11B:
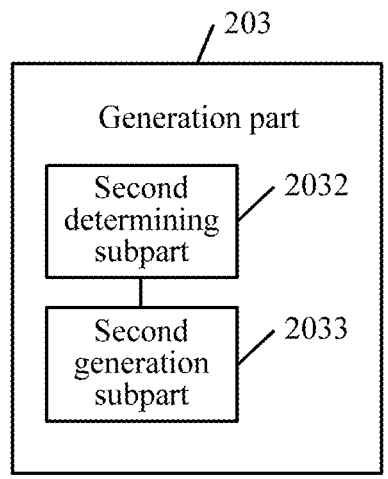
FIG. 11b is a schematic structural diagram of another generation part according to an embodiment of the present disclosure.
Figure 12:
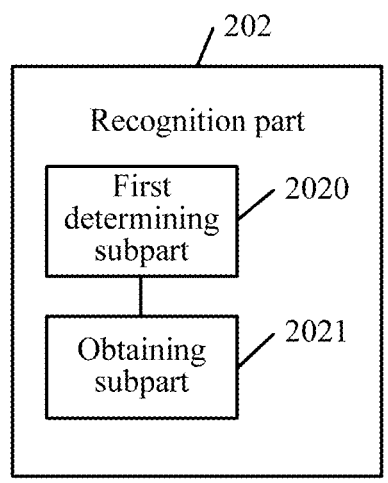
FIG. 12 is a schematic structural diagram of a recognition part according to an embodiment of the present disclosure.

Referring to FIG. 11a and FIG. 11b together, FIG. 11a and FIG. 11b are obtained by optimizing the route planning apparatus of FIG. 10, and FIG. 11a and FIG. 11b are two optional implementations of the generation part.

In an optional implementation, referring to FIG. 11a, the generation part 203 includes a searching subpart 2030 and a first generation subpart 2031.

The searching subpart 2030 is configured to invoke a map application, search a map for a geographic identifier including the keyword within a preset distance of the current geographic location of the terminal, and determine a geographic location, identified by the geographic identifier, as the target geographic location.

The first generation subpart 2031 is configured to generate at least one route from the current geographic location to the target geographic location.

In this embodiment of the present disclosure, if the type of the image is the indication sign type, an image processing system corresponding to the indication sign type is invoked to recognize the image, a keyword used for identifying the target geographic location is extracted from the image, optionally, a map application is invoked, a map is searched for a geographic identifier including the keyword within a preset distance of the current geographic location of the terminal, a geographic location identified by the geographic identifier is determined as the target geographic location, and at least one route from the current geographic location to the target geographic location is generated.

Optionally, referring to FIG. 6, a navigation system (such as, an image processing system) of this embodiment of the present disclosure processes the image and outputs key information. The key information may be a keyword of a target geographic location such as an indication sign, geographic location-related text content, and an indicative orientation graphic such as an arrow. Then, a current geographic location of the terminal is positioned by using the GPS of the map, the map APP is opened to search for a location around the current geographic location, and a proper route map is provided with reference to the orientation graphic to guide the user to walk.

As shown in FIG. 7, FIG. 7 is a diagram of detailed processing of a navigation system according to an embodiment of the present disclosure. The navigation system includes an image recognition system, an information selection system, and an information output system. The information recognition system determines information (including graphic information and text information) included by the image. The information selection system screens, according to the type of the image and usefulness, the information included in the image, to reserve useful information and remove useless information. Optionally, the image may include a useless graphic, effective geographic location text, useless text, an effective orientation graphic, and a useless graphic. Therefore, it is needed to set a preset rule to screen information in the image. For example, the preset rule may be setting a preset keyword and a preset graphic, and matching information included in the image with the preset keyword and the preset graphic, so as to obtain useful information in the image such as effective geographic location text and an effective orientation graphic. The information output system outputs the keyword of the target geographic location to the map app, to perform processing of other sections.

In an another optional implementation, referring to FIG. 11b, the generation part 203 includes a second determining subpart 2032 and a second generation subpart 2033.

The second determining subpart 2032 is configured to invoke a map application, and determine a location of the target geographic location in a map according to the key feature of the at least one reference object.

The second generation subpart 2033 is configured to generate at least one route from the current geographic location to the target geographic location.

In this embodiment of the present disclosure, if the type of the image is the geographic situation type, it is needed to determine at least one reference object according to the geographic situation in the image. The reference object may be a construction. Optionally, a key feature of the reference object is obtained. The key feature may be used for uniquely determining a geographic location of the reference object. For example, the key feature may be logo text on the construction. For example, usually, a construction has an identifier "XX Mansion". The key feature may alternatively be a shape feature of the construction. For example, Tencent Building has a unique shape feature. A name and a geographic location of the construction can be determined according to the shape of the construction. Optionally, the key feature may be an estimated angle between the reference object and the target geographic location. Alternatively, the key feature may be an estimated distance between the reference object and the target geographic location, and the like.

Optionally, referring to FIG. 6, a navigation system (such as, an image processing system) of this embodiment of the present disclosure processes the image and outputs key information. The key information may be a keyword of the reference object, an angle of the reference object, an approximate distance between the reference object and the target geographic location, and the like. Subsequently, an approximate location of the target geographic location in the map is determined according to the key feature of the reference object, and is displayed in the map. A current location of the terminal is positioned by using the GPS of the map, and then, at least one route from the current location to the target geographic location is planned.

Referring to FIG. 8, FIG. 8 is a diagram of detailed processing of a navigation system according to an embodiment of the present disclosure. The navigation system includes an image recognition system, an information selection system, and an information output system. The information recognition system determines information (including graphic information and text information) included by the image. The information included in the image may be a useless graphic and an effective reference object. When a reference object is determined, it is needed to select a reference object having a representative feature, so as to calculate an estimated angle between the reference object and a photographer, an estimated distance between the reference object and the photographer, and the like.

The information selection system determines a type of the image (the type includes an indication sign type and a geographic situation type) and usefulness, so as to reserve useful information and remove useless information. The useful information may be a reference object graphic. Further, an estimated angle between the reference object and the photographer and an estimated distance between the reference object and the photographer are calculated according to the reference object. The information output system outputs the target geographic location determined according to the key feature of the reference object. The map APP can plan at least one route from the current geographic location to the target geographic location.

A to-be-processed image is obtained, where the image is used for indicating a target geographic location that needs to be arrived at; when a trigger instruction for planning a route by using an image is detected, the image is recognized, and key information used for determining a target geographic location is obtained from the image; and at least one route from a current geographic location of a terminal to the target geographic location is generated according to key information. By recognizing an image used for indicating a target geographic location is recognized, this manner automatically plans a route, has high accuracy, and is convenient to use.

The route planning method provided by the embodiments of the present disclosure may be applied to an electronic device. The electronic device may be in a mobile device such as a mobile phone, a navigator, or may run in a server providing service support, such as data support, for navigation or route planning of a mobile terminal. The electronic device may include one or more memories and one or more processors connected to the memory. The memory may be a memory of different types such as a random memory, a read-only memory, a flash memory, and a solid-state disk or a mechanical hard disk. The processor may be a central processing unit, a micro processor, a digital signal processor, a programmable array or an application-specific integrated circuit, or the like, and may be used for implementing the route planning method of the foregoing one or more technical solutions such as one or more of the methods shown in FIG. 1, FIG. 2, and FIG. 6 to FIG. 8.

A person of ordinary skill in the art may understand that all or some of the procedures in the methods of the foregoing embodiments may be implemented by a computer program instructing relevant hardware. The program may be stored in a computer readable storage medium. The program corresponding to the route planning apparatus shown in FIG. 9 to FIG. 12 may be stored in a readable storage medium of a terminal, and is executed by at least one processor in the terminal, to implement the foregoing route planning method. The method includes the procedures in the method embodiments in FIG. 1 and FIG. 2. The foregoing storage medium may be: a magnetic disk, an optical disc, a read-only memory (ROM), a Random Access Memory (RAM), or the like. A non-transitory storage medium may be selected as the storage medium. Therefore, the embodiments of the present disclosure further provide a computer storage medium, the computer storage medium storing a computer program, and after being enabled by a processor, the computer program being capable of implementing the foregoing route planning method provided by any one or more of the foregoing technical solutions.

The embodiments of the present disclosure further provides a terminal, including:

a memory, configured to store a computer program; and a processor, connected to the memory and configured to implement the route planning method, provided by any one or more of the foregoing technical solutions, by executing the computer program.

The memory may be a device including various storage mediums, and may be configured to store the computer program. At least some of the storage mediums included in the memory are a non-transitory storage medium, capable of storing the computer program in a non-volatile manner.

The processor may be a device having an information processing function such as a microprocessor, a central processing unit, a digital signal processor, an application processor, or a programmable array or a specific integrated circuit.

The processor may be connected to the memory through a communications bus such as an integrated circuit bus, so as to read the computer program from the memory, and use the memory to store various data or provide data support.

In conclusion, in this embodiment, the processor can implement the route planning method, provided by any one or more of the foregoing technical solutions, by executing the computer program.

In some embodiments, the terminal further includes a display screen. The display screen may be a liquid crystal display screen, an e-ink display screen, or an organic light-emitting diode (OLED) display screen and can be configured to display a to-be-processed image and/or a planned route.

In some embodiments, the terminal further includes an image capturing module, such as a camera, configured to capture the to-be-processed image.

In some embodiments, the terminal further includes a communications interface. The communications interface may be configured to download the to-be-processed image from a network or receive the to-be-processed image from another device. The communications interface may include an antenna having data transmitting and receiving functions and the like.

In the several embodiments provided in the present application, it should be understood that the disclosed device and method may be implemented in other manners. The described device embodiments are merely exemplary. For example, the subpart division is merely logical function division and may be other division during actual implementation. For example, multiple subparts or components may be combined or integrated into another system, or some features may be ignored or not performed. In addition, the displayed or discussed mutual couplings or direct couplings or communication connections between the components may be implemented through some interfaces, indirect couplings or communication connections between the devices or subparts, or electrical connections, mechanical connections, or connections in other forms.

The subparts described as separation parts may be or may not be physically separated. The part displayed as the subpart may be or may not be a physical subpart. That is, the subparts may be located in a same place, or may be distributed to many network subparts. Some or all of the subparts need to be selected according to actual requirements to implement the purpose of the solution of the embodiments. In addition, functional subparts in the embodiments of the present disclosure may be all integrated in a processing part, each subpart is separately used as a subpart, or two or more subparts are integrated in a subpart. The integrated subpart may be implemented in a form of hardware, or may be implemented in form of hardware plus a software functional subpart.

A person of ordinary skill in the art may understand that the systems described herein may include a processor in communication with memory. Examples of the processor may include a general processor, a central processing unit, a microcontroller, a server, an application specific integrated circuit (ASIC), a digital signal processor, a field programmable gate array (FPGA), and/or a digital circuit, analog circuit, or some combination thereof. The processor may be one or more devices operable to execute logic. The logic may include computer executable instructions or computer code stored in the memory or in other memory that when executed by the processor, cause the processor to perform the features implemented by the logic of parts, subparts, systems, and/or operations described herein. The computer code may include instructions executable with the processor.

The memory may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device. In some examples, the memory may include at least one the parts, subpart, system (or portion thereof) described herein. In addition, the memory may include any other component previously discussed and/or other components described herein.

In some examples, each part, subpart, or system may include a logical component or logical components. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A route planning method, comprising:
    obtaining, by a processor, an image comprising displayable content;
    receiving, by the processor, a trigger instruction to plan a route based on the image;
    recognizing, by the processor, in response to receipt of the trigger instruction, feature content included in the displayable content, the feature content indicative of a target geographic location by:
        in response to determining that a type of the image comprises an indication sign type, identifying, by the processor, in the displayable content of the image, a keyword indicative of the target geographic location;
        searching, by the processor, a map for a geographic identifier corresponding to the keyword within a predetermined distance of a current geographic location of the terminal; and
        selecting, by the processor, a geographic location associated with the geographic identifier as the target geographic location; and
    generating, by the processor, in response to recognition of the feature content, at least one route from the current geographic location of the terminal to the target geographic location.

2. The method according to claim 1, wherein before recognizing, by the processor, in response to detection of the trigger instruction, the feature content included in the displayable content, the method further comprises:
    determining, by the processor, whether the type of the image comprises the indication sign type or a geographic situation type,
    wherein recognizing, by the processor, in response to detection of the trigger instruction, the feature content included in the displayable content further comprises:
    extracting, by the processor, from the image, the feature content based on the type of the image.

3. The method according to claim 2, wherein in response to determining that the type of the image comprises the indication sign type, extracting, by the processor, from the image, the feature content based on the type of the image identifies the keyword indicative of the target geographic location.

4. The method according to claim 2, in response to determining that the type of the image comprises the geographic situation type, extracting, by the processor, from the image, the feature content based on the type of the image comprises:
    determining, by the processor, at least one reference object based on physical objects represented by the displayable content in the image; and
    obtaining, by the processor, a key feature of the at least one reference object.

5. The method according to claim 4, wherein the key feature comprises at least one of an identifier of the reference object, a shape feature of the reference object, an estimated angle between the reference object and the target geographic location, and an estimated distance between the reference object and the target geographic location.

6. The method according to claim 5, further comprising:
    determining, by the processor, a location of the target geographic location in a map according to the key feature of the at least one reference object.

7. A system, comprising:
    a processor, the processor configured to:
    obtain an image comprising displayable content;
    receive a trigger instruction to plan a route based on the image;
    recognize, by an image recognition system, in response to receipt of the trigger instruction, feature content included in the displayable content, the feature content indicative of a target geographic location, wherein to recognize the feature content:
        in response to a determination that a type of the image comprises an indication sign type, identify, in the displayable content of the image, a keyword indicative of the target geographic location;

search a map for a geographic identifier corresponding to the keyword within a predetermined distance of a current geographic location of the terminal; and select a geographic location associated with the geographic identifier as the target geographic location; and generate, in response to recognition of the feature content, at least one route from a current geographic location of a terminal to the target geographic location.

8. The system of claim 7, wherein the processor is further configured to:

determine whether the type of the image comprises the indication sign type or a geographic situation type, wherein to recognize, by the image recognition system, in response to receipt of the trigger instruction, the feature content included in the displayable content, the processor is further configured to:

extract, from the image, the feature content based on the type of the image.

9. The system of claim 8, wherein in response to the type of the image comprising the indication sign type, to extract, from the image, the feature content based on the type of the image, the processor is further configured to:

identify, in the displayable content of the image, the keyword indicative of the target geographic location.

10. The system of claim 8, wherein in response to the type of the image comprising the geographic situation type, to extract, from the image, the feature content based on the type of the image, the processor is further configured to:

determine at least one reference object based on physical objects represented by the displayable content in the image; and obtain a key feature of the at least one reference object.

11. The system of claim 10, wherein the key feature comprises at least one of an identifier of the reference object, a shape feature of the reference object, an estimated angle between the reference object and the target geographic location, and an estimated distance between the reference object and the target geographic location.

12. The system of claim 11, wherein the processor is further configured to:

determine a location of the target geographic location in a map according to the key feature of the at least one reference object.

13. A non-transitory computer readable storage medium comprising:

instructions executable by a hardware processor, the instructions configured to cause the hardware processor to:

obtain an image comprising displayable content;

receive a trigger instruction to plan a route based on the image;

recognize, by an image recognition system, in response to receipt of the trigger instruction, feature content included in the displayable content, the feature content indicative of a target geographic location, wherein to recognize the feature content:

in response to a determination that a type of the image comprises an indication sign type, identify, in the displayable content of the image, a keyword indicative of the target geographic location;

search a map for a geographic identifier corresponding to the keyword within a predetermined distance of a current geographic location of the terminal; and select a geographic location associated with the geographic identifier as the target geographic location; and generate, in response to recognition of the feature content, at least one route from a current geographic location of a terminal to the target geographic location.

14. The non-transitory computer readable storage medium of claim 13, wherein the instructions executable by the hardware processor further cause the hardware processor to:

generate the trigger instruction in response to detection of a touch operation corresponding to the displayed image.

15. The non-transitory computer readable storage medium of claim 13, wherein the instructions executable by the hardware processor further cause the hardware processor to:

display, in response to generation of the route, the map comprising a graphical indicator representative of the at least one route from the current geographic location of the terminal to the target geographic location.

16. The non-transitory computer readable storage medium of claim 13, wherein the instructions executable by the hardware processor to recognize, by the image recognition system, in response to receipt of the trigger instruction, the feature content included in the displayable content further cause the hardware processor to:

determine whether the type of the image the indication sign type or a geographic situation type; and extract, from the image, the feature content based on the type of the image.

17. The non-transitory computer readable storage medium of claim 16, wherein in response to the type of the image comprising the indication sign type, the instructions executable by the hardware processor to extract, from the image, the feature content based on the type of the image further cause the hardware processor to:

identify, in the displayable content of the image, the keyword indicative of the target geographic location.

18. The system of claim 16, wherein in response to the type of the image comprising the geographic situation type, the instructions executable by the hardware processor to extract, from the image, the feature content based on the type of the image further cause the hardware processor to:

determine at least one reference object based on physical objects represented by the displayable content in the image;

obtain a key feature of the at least one reference object; and determine a location of the target geographic location in a map according to the key feature of the at least one reference object.

* * * * *